(12) United States Patent
Zhao

(10) Patent No.: US 9,813,376 B2
(45) Date of Patent: Nov. 7, 2017

(54) METHODS AND DEVICES FOR ACQUIRING MEDIA ACCESS CONTROL (MAC) ADDRESS

(71) Applicant: ZTE Corporation, Shenzhen (CN)

(72) Inventor: Qingling Zhao, Shenzhen (CN)

(73) Assignee: XI'AN ZHONGXING NEW SOFTWARE CO. LTD, Xi'An (CN)

(*) Notice: Subject to any disclaimer, the term of this patent is extended or adjusted under 35 U.S.C. 154(b) by 310 days.

(21) Appl. No.: 14/654,954

(22) PCT Filed: Sep. 25, 2013

(86) PCT No.: PCT/CN2013/084201
§ 371 (c)(1),
(2) Date: Jun. 23, 2015

(87) PCT Pub. No.: WO2014/101499
PCT Pub. Date: Jul. 3, 2014

(65) Prior Publication Data
US 2015/0350158 A1 Dec. 3, 2015

(30) Foreign Application Priority Data
Dec. 24, 2012 (CN) .......................... 2012 1 0568115

(51) Int. Cl.
*H04L 29/08* (2006.01)
*H04L 29/12* (2006.01)
(Continued)

(52) U.S. Cl.
CPC ...... *H04L 61/6045* (2013.01); *H04L 12/6418* (2013.01); *H04L 61/103* (2013.01);
(Continued)

(58) Field of Classification Search
None
See application file for complete search history.

(56) References Cited

U.S. PATENT DOCUMENTS

| 8,711,864 B1* | 4/2014 | Ko | H04L 12/4633 370/381 |
| 2008/0043665 A1* | 2/2008 | Jeon | H04W 8/26 370/328 |

(Continued)

FOREIGN PATENT DOCUMENTS

| CN | 101404611 A | 4/2009 |
| CN | 102208945 A | 10/2011 |

(Continued)

OTHER PUBLICATIONS

International Search Report for corresponding application PCT/CN2013/084201 filed Sep. 25, 2013, dated Jan. 2, 2014.

*Primary Examiner* — Natisha Cox
(74) *Attorney, Agent, or Firm* — Cantor Colburn LLP

(57) ABSTRACT

Provided are methods and devices for acquiring a Media Access Control (MAC) address. According to a method for acquiring an MAC address, an MAC address request message is received, wherein the MAC address request message carries a Fibre Channel Identifier (FCID); whether the FCID is matched with an FCID of a receiver receiving the MAC address request message or not is judged; and when it is judged that the FCID is matched with the FCID of the receiver receiving the MAC address request message, the receiver sends a response message, wherein the response message carries an MAC address of the receiver. The technical solution solves the problem in a related technology that communication cannot be directly performed through the link layer, and has the effect of directly acquiring an MAC address corresponding to an FCID of an opposite end so as to perform communication by fast switching at the link layer.

14 Claims, 4 Drawing Sheets

(51) Int. Cl.
    *H04L 12/64*  (2006.01)
    *H04L 12/931* (2013.01)
(52) U.S. Cl.
    CPC ...... *H04L 61/2069* (2013.01); *H04L 61/6022* (2013.01); *H04L 49/357* (2013.01)

(56) References Cited

U.S. PATENT DOCUMENTS

| | | | | |
|---|---|---|---|---|
| 2011/0044344 A1* | 2/2011 | Hudson | ................ | H04L 12/433 370/395.53 |
| 2011/0051733 A1* | 3/2011 | Hirata | .................... | H04L 49/10 370/400 |
| 2012/0163374 A1* | 6/2012 | Shah | .................... | H04L 12/413 370/357 |
| 2014/0359137 A1* | 12/2014 | Liu | ...................... | H04L 67/141 709/227 |

FOREIGN PATENT DOCUMENTS

| | | | |
|---|---|---|---|
| CN | 102209023 | A | 10/2011 |
| CN | 102624613 | A | 8/2012 |
| CN | 103023785 | A | 4/2013 |

\* cited by examiner

METHODS AND DEVICES FOR ACQUIRING MEDIA ACCESS CONTROL (MAC) ADDRESS

TECHNICAL FIELD

The present disclosure relates to the field of communications, and particularly to methods and devices for acquiring a Media Access Control (MAC) address.

BACKGROUND

In a Fibre Channel Over Ethernet (FCoE) network formed according to Fabric topology, an Ethernet Node (ENode) is able to acquire information including a Fibre Channel Identifier (FCID) and so on of other ENodes through a name server; however, transmission of an FCoE frame also requires an MAC address. A current name server does not provide MAC address information corresponding to an FCID, and an ENode only knows an MAC address of a Fibre Channel Forwarder (FCF) to which the ENode is logged in, thus an FCoE frame between two ENodes can only be forwarded through an FCF device, and communication cannot be performed directly by link layer switching. If two ENodes connected by Fabric are able to acquire an MAC address from each other, the two can perform data interaction directly by link switching, thereby achieving higher transmission efficiency.

In addition, in the lossless Ethernet, various devices having a switching function generally implement fast switching by maintaining an MAC-Port table. The MAC table is learned through a source MAC address in a header of a received Ethernet message, and ages regularly. A Fabric Login (FLOGI) virtual link established in an FCoE network will keep a link alive regularly. The MAC table of a keep-alive switching device in a network can be updated by a keep-alive frame sent mutually. However, the keep-alive frame is sent at a relatively long interval, e.g. 8 seconds, or even 90 seconds, and the MAC table cannot be updated fast if a condition including aging of an MAC item or switching of a link and so on occurs during this process.

There is no effective solution for solving the problem in a related technology that communication cannot be directly performed through the link layer.

SUMMARY

The embodiments of the present disclosure provide methods and devices for acquiring an MAC address to at least solve the foregoing problem.

A method for acquiring an MAC address is provided according to an aspect of the embodiments of the present disclosure, including that an MAC address request message is received, wherein the MAC address request message carries an FCID; whether the FCID is matched with an FCID of a receiver receiving the MAC address request message or not is judged; when it is judged that the FCID is matched with the FCID of the receiver receiving the MAC address request message, the receiver sends a response message, wherein the response message carries an MAC address of the receiver.

In an example embodiment, the operation that the MAC address request message is received includes that an MAC address request message sent by an ENode or an FCF of an FCoE is received.

A method for acquiring an MAC address is provided according to another aspect of the embodiments of the present disclosure, including that an MAC address request message is sent, wherein the MAC address request message carries an FCID; a response message of the MAC address request message is received, wherein the response message is a response message sent by a responder matched with the FCID and the response message carries an MAC address of the responder.

In an example embodiment, the MAC address request message is sent via a broadcast, multicast or unicast method.

In an example embodiment, the operation that the MAC address request message is sent via the broadcast, multicast or unicast method includes that when the responder matched with the FCID is unknown, an MAC address request message in which a target MAC is a broadcast MAC is sent to acquire the MAC address; when the responder matched with the FCID is known, an MAC address request message in which a target MAC is a unicast MAC is sent to determine whether the target MAC is in an FCoE network or not.

In an example embodiment, after the response message of the MAC address request message is received, the method further includes that an MAC information table is updated according to the response message, wherein the MAC information table includes an MAC port table.

A device for acquiring an MAC address is provided according to still another aspect of the embodiments of the present disclosure, including: an ENode receiving component, configured to receive an MAC address request message, wherein the MAC address request message carries an FCID; an ENode judging component configured to judge whether the FCID is matched with an FCID of a receiver receiving the MAC address request message or not; an ENode sending component configured to send a response message when it is judged that the FCID is matched with the FCID of the receiver receiving the MAC address request message, wherein the response message carries an MAC address of the receiver.

In an example embodiment, the ENode receiving component is configured to receive an MAC address request message sent by an ENode or an FCF of an FCoE.

A device for acquiring an MAC address is provided according to still another aspect of the embodiments of the present disclosure, including: a sending component, configured to send an MAC address request message, wherein the MAC address request message carries an FCID; a receiving component, configured to receive a response message of the MAC address request message, wherein the response message is a response message sent by a responder matched with the FCID and the response message carries an MAC address of the responder.

In an example embodiment, the device further includes an updating component, configured to update an MAC information table according to the response message, wherein the MAC information table includes an MAC port table.

By means of the embodiments of the present disclosure, an MAC address request message is received first, wherein the MAC address request carries an FCID; whether the FCID is matched with an FCID of a receiver receiving the MAC address request message or not is judged subsequently; when it is judged that the FCID is matched with the FCID of the receiver receiving the MAC address request message, the receiver sends a response message, wherein the response message carries an MAC address of the receiver. The technical solution solves the problem in a related technology that communication cannot be directly performed through the link layer, and has the effect of directly acquiring an MAC address corresponding to an FCID of an opposite end so as to perform communication by fast switching at the link layer.

BRIEF DESCRIPTION OF THE DRAWINGS

The accompanying drawings illustrated herein are used for providing further understanding to the present disclosure and constitute a part of the present application. The schematic embodiments and description thereof of the present disclosure are used for explaining the present disclosure instead of constituting improper limitation to the present disclosure. In the accompanying drawings.

DETAILED DESCRIPTION OF THE EMBODIMENTS

The present disclosure will be expounded hereinafter with reference to the accompanying drawings and in combination with the embodiments. It should be noted that the embodiments in the present application and the characteristics in the embodiments may be combined with each other if there is no conflict.

Embodiment 1

Figure 1:
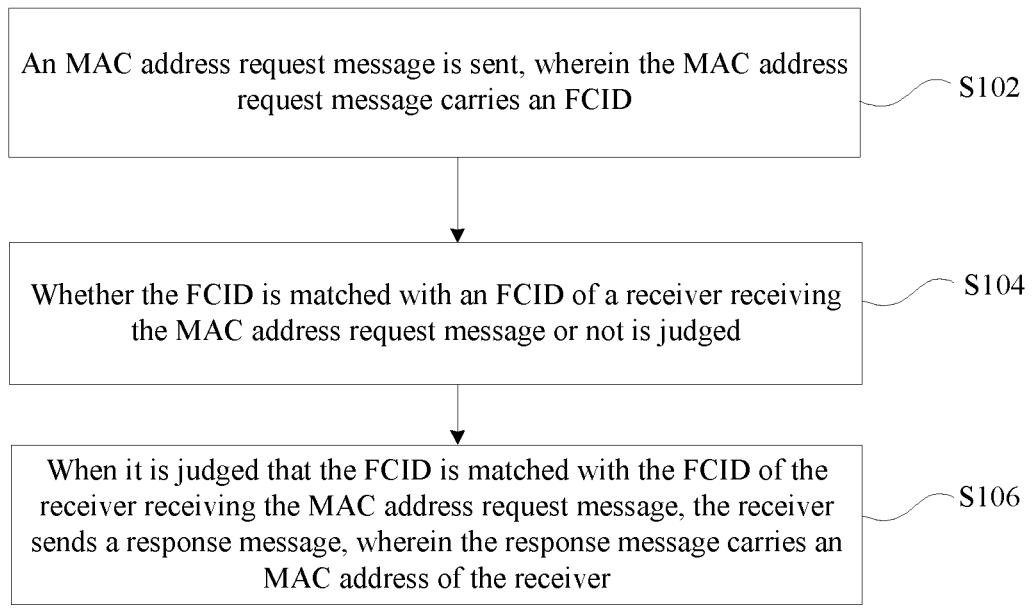
FIG. 1 is a first flowchart of a method for acquiring an MAC address according to an embodiment of the present disclosure.

An embodiment of the present disclosure provides a method for acquiring an MAC address. FIG. 1 is a first flowchart of a method for acquiring an MAC address according to an embodiment of the present disclosure. As shown in FIG. 1, the flow includes the following steps.

Step 102: An MAC address request message is sent, wherein the MAC address request message carries an FCID.

Step 104: Whether the FCID is matched with an FCID of a receiver receiving the MAC address request message or not is judged.

Step 106: When it is judged that the FCID is matched with the FCID of the receiver receiving the MAC address request message, the receiver sends a response message, wherein the response message carries an MAC address of the receiver.

A method of performing communication through FCF forwarding in a related technology has been changed through the foregoing steps. An MAC address of an opposite end is acquired directly so that each of the communicating devices at two ends can acquire an MAC address corresponding to an FCID of its opposite end. Communication is performed through fast switching at the link layer, thus further improving a communication rate.

There are many methods for receiving the MAC address request message. In an example embodiment, an MAC address request message sent by an ENode or an FCF may be received. If an MAC address request message is received from an ENode, ENodes at two ends may be enabled to communicate through their respective MAC addresses. If an MAC address request message sent by an FCF is received, interaction of MAC addresses may be performed initiatively in cases where an MAC-PORT table of a device in a network needs to be updated immediately, e.g., during link switching and so on, thus updating the MAC-PORT table fast.

Embodiment 2

Figure 2:
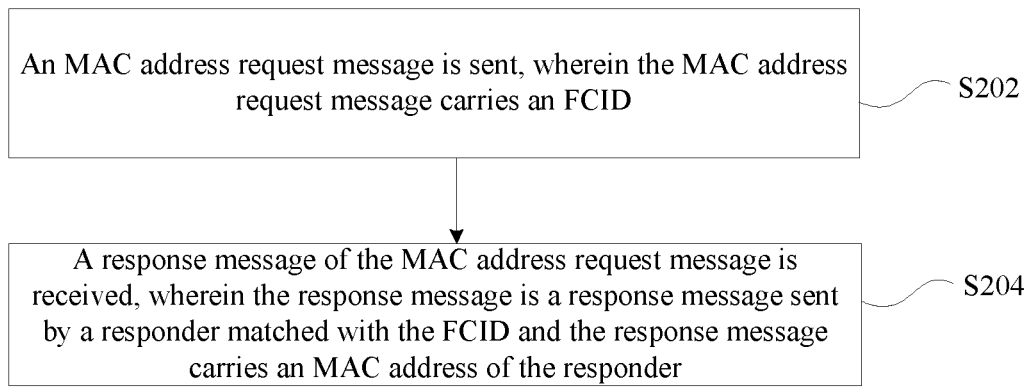
FIG. 2 is a second flowchart of a method for acquiring an MAC address according to an embodiment of the present disclosure.

An embodiment of the present disclosure provides another method for acquiring an MAC address. FIG. 2 is a second flowchart of a method for acquiring an MAC address according to an embodiment of the present disclosure. As shown in FIG. 2, the flow includes the following steps.

Step 202: An MAC address request message is sent, wherein the MAC address request message carries an FCID.

Step 204: A response message of the MAC address request message is received, wherein the response message is a response message sent by a responder matched with the FCID and the response message carries an MAC address of the responder.

In an example embodiment, the MAC address request message may be sent via a broadcast, multicast or unicast method.

In an example embodiment, the operation that the MAC address request message is sent via the broadcast, multicast or unicast method includes that when the responder matched with the FCID is unknown, an MAC address request message in which a target MAC (MAC address) is a broadcast MAC (MAC address) is sent, to acquire the MAC address; when the responder matched with the FCID is known, an MAC address request message in which a target MAC (MAC address) is a unicast MAC (MAC address) is sent, to determine whether the target MAC (MAC address) is in an FCoE network or not.

In an example embodiment, after the response message of the MAC address request message is received, the method further includes that an MAC information table is updated according to the response message, wherein the MAC information table includes an MAC port table.

Embodiment 3

Figure 1A:
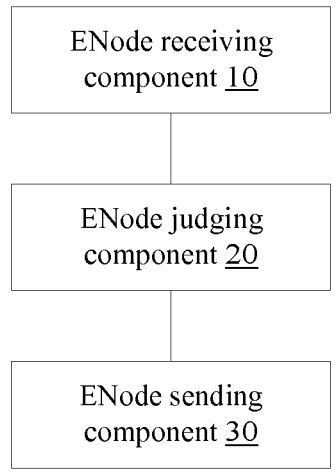
FIG. 1a is a first structural block diagram of a device for acquiring an MAC address according to an embodiment of the present disclosure.

An embodiment of the present disclosure provides a device for acquiring an MAC address. FIG. 1a is a first structural block diagram of a device for acquiring an MAC address according to an embodiment of the present disclosure. As shown in FIG. 1a, the device includes:

an ENode receiving component 10, configured to receive an MAC address request message, wherein the MAC address request message carries an FCID;

an ENode judging component 20 configured to judge whether the FCID is matched with an FCID of a receiver receiving the MAC address request message or not;

an ENode sending component 30 configured to send a response message when it is judged that the FCID is matched with the FCID of the receiver receiving the MAC address request message, wherein the response message carries an MAC address of the receiver.

In an example embodiment, the ENode receiving component 10 may be configured to receive an MAC address request message sent by an ENode or an FCF of an FCoE.

Embodiment 4

Figure 2A:
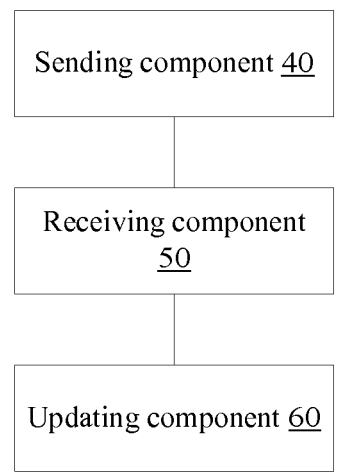
FIG. 2a is a second structural block diagram of a device for acquiring an MAC address according to an embodiment of the present disclosure.

An embodiment of the present disclosure provides a device for acquiring an MAC address. FIG. 2a is a second structural block diagram of a device for acquiring an MAC address according to an embodiment of the present disclosure. As shown in FIG. 2a, the device includes:

a sending component 40, configured to send an MAC address request message, wherein the MAC address request message carries an FCID;

a receiving component 50, configured to receive a response message of the MAC address request message, wherein the response message is a response message sent by a responder matched with the FCID and the response message carries an MAC address of the responder. The responder may be a party receiving the MAC address request message, and a sender may be a party sending the MAC address request message.

In an example embodiment, the device may further include an updating component 60, configured to update an MAC information table according to the response message, wherein the MAC information table includes an MAC port table.

Embodiment 5

An embodiment of the present disclosure provides a method for acquiring an MAC address. An FCoE device may request for an MAC address corresponding to a designated FCID from a network. Upon receiving the request, a device having the designated FCID sends to a sender a response carrying MAC address information corresponding to the FCID.

Figure 3:
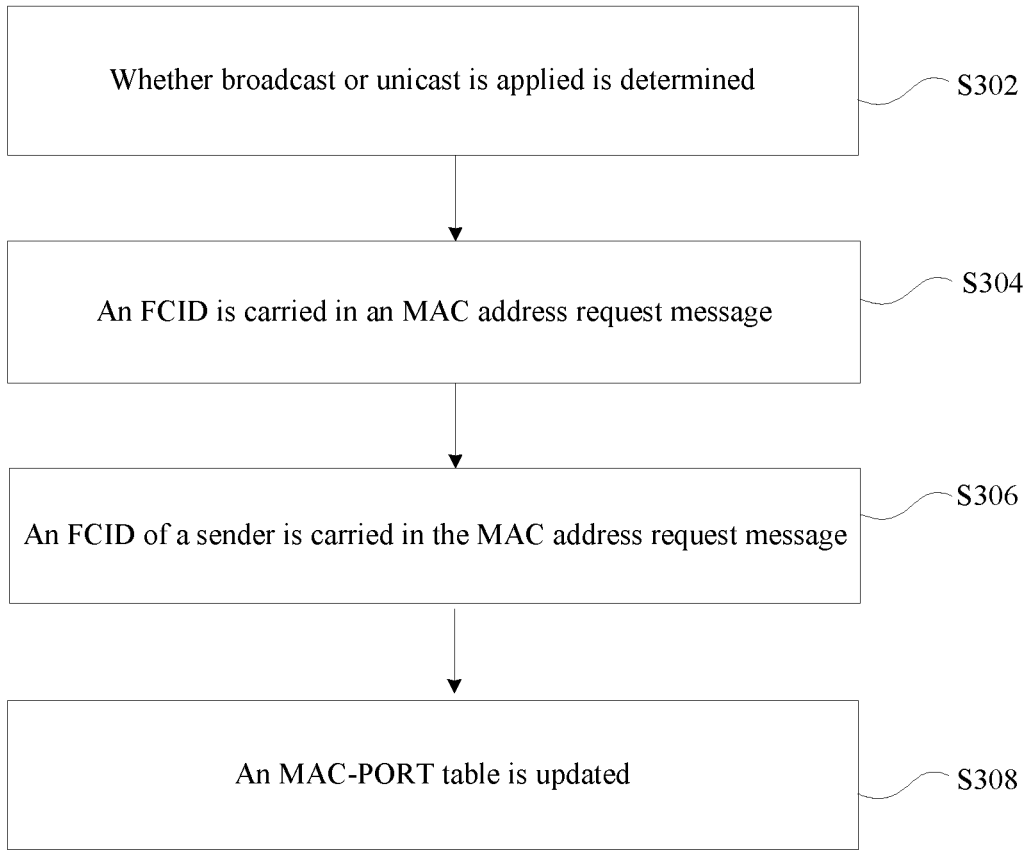
FIG. 3 is a flowchart of processing a request message according to an embodiment of the present disclosure.

FIG. 3 is a flowchart of processing a request message according to an embodiment of the present disclosure. As shown in FIG. 3, the flow includes the following steps.

Step 302: Whether broadcast or unicast is applied is determined.

In an Ethernet header, a target MAC (MAC address) may be a broadcast MAC (MAC address) or a unicast MAC (MAC address). If an MAC (MAC address) corresponding to a requested FCID is unknown, the broadcast MAC (MAC address) is used as the target MAC (MAC address). If the MAC (MAC address) corresponding to the requested FCID is known, and it is currently needed to determine whether the target MAC (MAC address) still exists in a network, then the unicast MAC (MAC address) may be used as the target MAC (MAC address), so as to reduce the burden brought to the Ethernet.

Step 304: An FCID is carried in an MAC address request message.

The requested FCID and MAC address information corresponding to the FCID are carried. An all-zero MAC address may be carried if the corresponding MAC (MAC address) is unknown.

Step 306: An FCID of a sender is carried in the MAC address request message.

An FCID of a local end, i.e. the sender, and MAC address information of the sender are carried.

Step 308: An MAC-PORT table is updated.

After receiving a response message, the sender parses and records the MAC information corresponding to the requested FCID and starts to calculate a survival time. If the survival time of the recorded MAC information reaches a designated survival period, the information may be aged, and a request is sent again to update this information.

After receiving the request message, a device having the same FCID carried in the request message sends a response message to the sender. If this device needs an MAC address of the sender, and the FCID and the MAC address of the sender have been carried in the request message, this device may record the MAC address of the sender directly without sending a request again.

Figure 4:
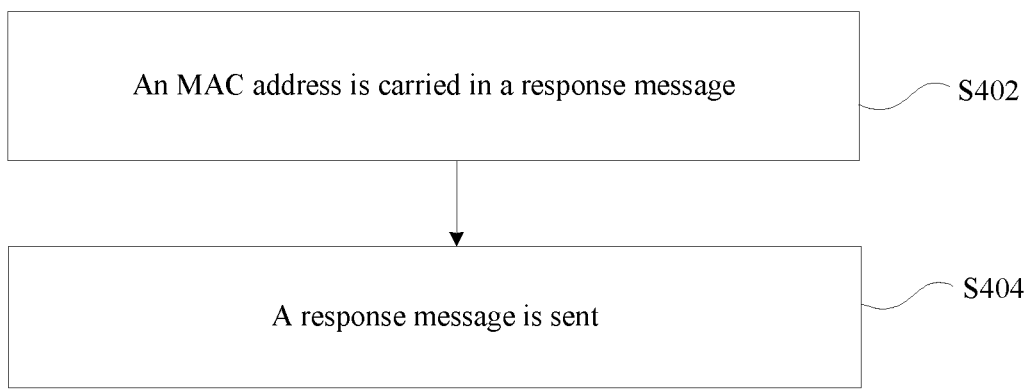
FIG. 4 is a flowchart of processing a response message according to an embodiment of the present disclosure.

FIG. 4 is a flowchart of processing a response message according to an embodiment of the present disclosure. As shown in FIG. 4, the flow includes the following steps.

Step 402: An MAC address is carried in a response message.

In a response message of an MAC address request message, a target MAC (MAC address) in an Ethernet header is set as a unicast MAC (MAC address) of the sender. The response message should carry a requested FCID and MAC address, i.e. an FCID and an MAC (MAC address) of the responder, and may also carry an FCID and an MAC (MAC address) of the sender. Of course, the latter may not be carried in the response message.

Step 404: The response message is sent.

Embodiment 6

Figure 5:
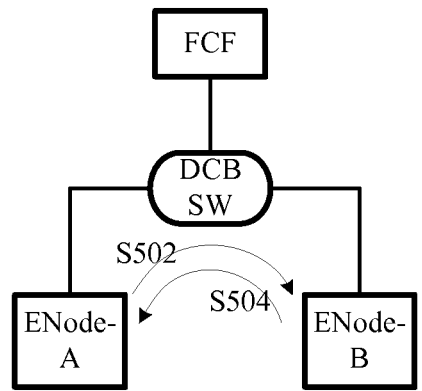
FIG. 5 is a first flowchart of a method for acquiring an MAC address according to an example embodiment of the present disclosure.

FIG. 5 is the first flowchart of a method for acquiring an MAC address according to an example embodiment of the present disclosure. In the present embodiment, two ENodes need to acquire the MAC address of each other so as to implement direct interaction of an FCoE service frame. The processing steps of the flow are as shown in FIG. 5, including:

Step 502: A broadcast MAC address request message is sent.

When ENode A has acquired an FCID of ENode B through a name service and needs to acquire an MAC address corresponding to the FCID, ENode A sends a broadcast MAC request to a network at the moment, i.e. an MAC address request message is sent by a broadcast method. A format of the request message is as shown in the following table.

| Broadcast target MAC | MAC-A | ETH-TYPE | . . . | FCID-B | ALL Zero MAC | FCID-A | MAC-A | . . . |
|---|---|---|---|---|---|---|---|---|

In the table above, the broadcast target MAC indicates that the MAC address request message is sent by a broadcast method; the ETH-TYPE indicates a type of the Ethernet; the FCID-B indicates the FCID of ENode B; the ALL Zero MAC indicates that the MAC address of ENode B is unknown and therefore set as 0; the FCID-A indicates an FCID of ENode A; the former MAC-A is a source MAC address in an Ethernet header and the latter MAC-A is sender information carried in a payload of the message, i.e. an MAC address of ENode A. It is set that the FCID and the MAC address of the sender are recorded by a responder directly and it is unnecessary to send a request again. As required by component hierarchy, the embodiment of the present disclosure may also only focus on information in the payload, and the Ethernet header is only applied to verification and switching of a packet received at a bottom layer.

Step 504: The MAC address request message is responded.

After receiving the request message, ENode B determines whether the FCID-B acquired through parsing is matched with the FCID of the ENode B itself, and if the FCID-B acquired through parsing is matched with the FCID of the ENode B itself, stores the FCID and MAC address information of ENode A and responds to the requested FCID when an MAC response is supported by ENode B. A format of the response message is as shown in the following table.

| MAC-A | MAC-B | ETH-TYPE | ... | FCID-A | MAC-A | FCID-B | MAC-B | ... |

In the table above, the broadcast target MAC indicates that the MAC address request message is sent by a broadcast method; the MAC-A indicates the MAC address of ENode A; the ETH-TYPE indicates a type of the Ethernet; the FCID-B indicates the FCID of ENode B; the ALL Zero MAC indicates that the MAC address of ENode B is unknown and therefore set as 0; and the FCID-A indicates the FCID of ENode A.

Step 506: Service interaction is performed.

After receiving the response message, ENode A parses out MAC address information of ENode B, then ENode A and ENode B may perform service interaction through the acquired MAC addresses directly, thus further improving the efficiency of data communication.

Embodiment 7

A device sending the request is not limited to an ENode. Since the ENode is not necessarily in direction connection with an FCF to which the ENode is logged in, an MAC-Port table at the bottom plane of link switching also needs to be updated regularly although the FCF has known an MAC address corresponding to an FCID of the logged-in ENode. The FCF may also need to update an MAC-Port table of the local device or a downstream switching device in some cases, including link switching, switching between a master port and a standby port, and switching between a master device and a standby device, and so on, which may be also implemented by sending an MAC request initiatively. An application of an embodiment of the present disclosure on an FCF will be described thereinafter through an example.

Figure 6:
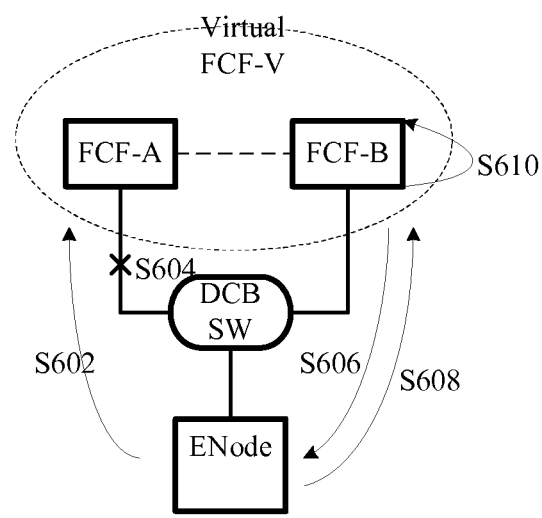
FIG. 6 is a second flowchart of a method for acquiring an MAC address according to an example embodiment of the present disclosure.

FIG. 6 is the second flowchart of a method for acquiring an MAC address according to an example embodiment of the present disclosure. An FCF-A and an FCF-B in FIG. 6 are virtualized into a logical device FCF-V to implement mutual backup. After an ENode logs in to the FCF-V, if the currently logged-in entity FCF is switched from one FCF to another FCF, then the new FCF after the switching sends an MAC address request message to the ENode immediately, to acquire a corresponding access physical port of an ENode MAC address on a requested FCF and update a port table corresponding to the MAC address. As shown in FIG. 6, the flow includes the following steps.

Step 602: The ENode logs in to an FCF.

After the ENode logs in to the FCF-V, the FCF-A actually logged in allocates an FCID and an MAC address for the ENode. All service data of the ENode is actually forwarded through the FCF-A. The FCF-A notifies the FCF-B of the information of the ENode for an FCF backup purpose.

Step 604: the FCF-A is disconnected from the network.

The FCF-A is disconnected from a Date Center Bridge Switch (DCB SW), and the FCF-B needs to take over the ENode. The FCF-B is already provided with the FCID and MAC information of the ENode, but needs to know an FCF-B physical port through which the ENode is accessed.

Step 606: The FCF-B sends an MAC address request message to the ENode.

The FCF-B sends the MAC address request message to the ENode. Since the FCF-B is already provided with the MAC address information of the ENode, the request is mainly sent in order to update an MAC table. The request may be sent by a broadcast method, and may be also sent by a unicast method.

Step 608: The ENode replies with a response.

After receiving the MAC address request message, the ENode parses out whether an FCID of the receiver in the request message is matched with an FCID of the ENode itself, and replies with a response if they are matched.

Step 610: An MAC-Port table is updated.

After receiving the response, the FCF-B updates the MAC-Port table and stores a port number corresponding to the MAC address of the ENode.

It may be seen from the foregoing description that the embodiments of the present disclosure achieve the following technical effect: two ENodes may be enabled to acquire an MAC address corresponding to an FCID of each other directly, and communication is performed by fast switching at the link layer without FCF forwarding. Interaction of MAC addresses may be performed initiatively in cases in which an MAC-Port table of a device in a network needs to be updated immediately, including link switching and so on, thereby updating the MAC-Port table fast so that the devices at the two ends may acquire an MAC address of the other end directly.

Obviously, those skilled in the art should understand that, each component or each step of the present disclosure may be implemented by a universal computing device. They may be concentrated on a single computing device or distributed on a network composed of a plurality of computing devices. Optionally, they may be implemented by program codes executable by a computing device so that they may be stored in a storage device and executed by the computing device. In addition, the steps illustrated or described may be executed according to sequences different from the sequences described herein in some cases, or they may be implemented by respectively fabricating them into each integrated circuit component, or by fabricating a plurality of components or steps of them into a single integrated circuit component. In this way, the present disclosure is not limited to any specific combination of software and hardware.

The above are only example embodiments of the present disclosure, but are not used for limiting the present disclosure. For those skilled in the art, the present disclosure may have various alterations and variations. Any modification, equivalent replacement, improvement and so on made within the principle of the present disclosure should be included within the scope of protection defined by the claims of the present disclosure.

INDUSTRIAL APPLICABILITY

As described above, a method and device for acquiring an MAC address according to the embodiments of the present disclosure have the following beneficial effect: two ENodes may be enabled to acquire an MAC address corresponding to an FCID of each other directly, and communication is performed by fast switching at the link layer without FCF forwarding. In addition, interaction of MAC addresses may be performed initiatively in cases, including link switching and so on in which an MAC-Port table of a device in a network needs to be updated immediately, thereby updating the MAC-Port table fast so that the devices at the two ends may acquire an MAC address of the other end directly.

What is claimed is:

1. A method for acquiring a Media Access Control (MAC) address, comprising:

receiving an MAC address request message, wherein the MAC address request message carries a Fibre Channel Identifier (FCID);

judging whether the FCID is matched with an FCID of a receiver receiving the MAC address request message or not;

when it is judged that the FCID is matched with the FCID of the receiver receiving the MAC address request message, sending, by the receiver, a response message, wherein the response message carries an MAC address of the receiver.

2. The method according to claim 1, wherein receiving the MAC address request message comprises: receiving the MAC address request message sent by an Ethernet Node (ENode) or a Fibre Channel Forwarder (FCF) of a Fibre Channel Over Ethernet (FCoE).

3. A method for acquiring a Media Access Control (MAC) address, comprising:

sending an MAC address request message, wherein the MAC address request message carries a Fibre Channel Identifier (FCID);

receiving a response message of the MAC address request message, wherein the response message is a response message sent by a responder matched with the FCID and the response message carries an MAC address of the responder.

4. The method according to claim 3, wherein the MAC address request message is sent via a broadcast, multicast or unicast method.

5. The method according to claim 4, wherein sending the MAC address request message via the broadcast, multicast or unicast method comprises:

when the responder matched with the FCID is unknown, sending an MAC address request message in which a target MAC is a broadcast MAC, to acquire the MAC address;

when the responder matched with the FCID is known, sending an MAC address request message in which a target MAC is a unicast MAC, to determine whether the target MAC is in a Fibre Channel Over Ethernet (FCoE) network or not.

6. The method according to claim 3, wherein after receiving the response message of the MAC address request message, the method further comprises: updating an MAC information table according to the response message, wherein the MAC information table comprises an MAC port table.

7. A device for acquiring a Media Access Control (MAC) address, comprising:

an Ethernet Node (ENode) receiving component, configured to receive an MAC address request message, wherein the MAC address request message carries a Fibre Channel Identifier (FCID);

an ENode judging component configured to judge whether the FCID is matched with an FCID of a receiver receiving the MAC address request message or not;

an ENode sending component configured to send a response message when it is judged that the FCID is matched with the FCID of the receiver receiving the MAC address request message, wherein the response message carries an MAC address of the receiver.

8. The device according to claim 7, wherein the ENode receiving component is configured to receive the MAC address request message sent by an ENode or a Fibre Channel Forwarder (FCF) of a Fibre Channel Over Ethernet (FCoE).

9. A device for acquiring a Media Access Control (MAC) address, comprising:

a sending component, configured to send an MAC address request message, wherein the MAC address request message carries a Fibre Channel Identifier (FCID);

a receiving component, configured to receive a response message of the MAC address request message, wherein the response message is a response message sent by a responder matched with the FCID and the response message carries an MAC address of the responder.

10. The device according to claim 9, wherein the device further comprises an updating component, configured to update an MAC information table according to the response message, wherein the MAC information table comprises an MAC port table.

11. The method according to claim 4, wherein after receiving the response message of the MAC address request message, the method further comprises: updating an MAC information table according to the response message, wherein the MAC information table comprises an MAC port table.

12. The method according to claim 5, wherein after receiving the response message of the MAC address request message, the method further comprises: updating an MAC information table according to the response message, wherein the MAC information table comprises an MAC port table.

13. The device according to claim 9, wherein the sending component is configured to send the MAC address request message via a broadcast, multicast or unicast method.

14. The device according to claim 13, wherein the sending component is configured to send the MAC address request message via the broadcast, multicast or unicast method in the following manner:

when the responder matched with the FCID is unknown, sending an MAC address request message in which a target MAC is a broadcast MAC, to acquire the MAC address;

when the responder matched with the FCID is known, sending an MAC address request message in which a target MAC is a unicast MAC, to determine whether the target MAC is in a Fibre Channel Over Ethernet (FCoE) network or not.

* * * * *